US005363743A

United States Patent [19]

Raddatz et al.

[11] Patent Number: 5,363,743

[45] Date of Patent: Nov. 15, 1994

[54] FLUID PRESSURE SERVOMOTOR

[75] Inventors: Claus D. Raddatz, Bolingbrook; Ronald J. Wojtecki, Naperville; Norman E. Zerndt, Palatine, all of Ill.

[73] Assignee: Eaton Corporation, Cleveland, Ohio

[21] Appl. No.: 48,162

[22] Filed: Apr. 14, 1993

[51] Int. Cl.[5] .................. F16J 3/02

[52] U.S. Cl. .................. 92/98 D; 92/101

[58] Field of Search .................. 92/128, 98 D, 99, 101

[56] References Cited

U.S. PATENT DOCUMENTS

| | | | |
|---|---|---|---|
| 335,033 | 1/1886 | Locke | 92/101 |
| 1,077,472 | 11/1913 | Hofmann | 92/101 |
| 3,180,235 | 4/1965 | Schmitz | 92/98 D X |
| 3,309,967 | 3/1967 | Taplin | 92/101 |
| 3,730,495 | 5/1973 | Elam | 92/98 D X |
| 3,762,280 | 10/1973 | Kreuter et al. | 92/98 D |
| 4,056,043 | 11/1977 | Sriramamurty et al. | 92/98 D X |
| 4,251,050 | 2/1981 | McInerney | 92/98 D X |
| 4,688,774 | 8/1987 | Warmuth, II | 92/98 D X |

*Primary Examiner*—Edward K. Look
*Assistant Examiner*—John Ryznic
*Attorney, Agent, or Firm*—Roger A. Johnston

[57] ABSTRACT

A fluid pressure operated servomotor having a housing shell containing a flexible diaphragm forming a fluid pressure chamber with a port through the housing connectable for receiving a fluid pressure signal. The diaphragm has a rigid insert extending therethrough and sealed thereabout with a cup shape on the interior of the chamber and having a rod pivot surface formed on the exterior side of the diaphragm. A spring inside the chamber has one end registered in the cupped shape to bias the diaphragm insert in one direction. In one embodiment, the insert is shaped to have a rod pivot surface nested in the coils spring such that the rod pivot load resists lateral buckling of the spring; and, in another embodiment, a shroud is formed on the insert about the rod pivot surface for limiting rotation of the insert with respect to the rod end.

10 Claims, 2 Drawing Sheets

FLUID PRESSURE SERVOMOTOR

BACKGROUND OF THE INVENTION

The present invention relates to fluid pressure operated devices of the type wherein a flexible membrane or diaphragm is responsive to changes in fluid pressure for providing force output to an actuator member which is adapted for connection to perform a mechanical function. Fluid pressure servomotors are often used in applications wherein a vacuum pressure signal is employed to provide control of a mechanical member for a desired function. Vacuum pressure signal operated servomotors have found widespread use in automotive applications where a vacuum or negative pressure signal is readily available, as from an engine manifold depression which generally varies inversely as the load on the engine. Thus, a manifold depression signal may be employed to operate a servomotor to control various devices such as exhaust gas recirculation controllers or engine boost-air inlet valves, or other devices to be controlled in relationship to variations in load on the engine.

In designing and fabricating vacuum operated servomotors for automotive applications where a substantial mechanical force output is required, it is necessary to provide a flexible diaphragm having a substantial area exposed to the vacuum signal in order to provide the desired mechanical force output on the actuating member as, for example, a push rod. In such applications the servomotor output member is often connected to a mechanism, such as a crank arm of a butterfly valve, which produces transverse or arcuate motion of the output member in response to movement in the direction of the output force. This transverse or arcuate motion of the output member results in the reaction applying side loading on the diaphragm, which can cause the return spring on the diaphragm to buckle and permit the diaphragm to rotate within the servomotor and thus can cause damage and premature failure of the diaphragm.

Thus, it has been desired to find a way or means of constructing a fluid pressure actuated servomotor having a flexible diaphragm connected to one end of an actuating output member such that the movement of the actuator when applying sideloads to the diaphragm does not buckle the diaphragm return spring and result in consequent adverse rotation of the diaphragm.

BRIEF DESCRIPTION OF THE DRAWINGS

FIG. I is a cross-section of a fluid pressure operated servomotor responsive to two fluid pressure signals.

DETAILED DESCRIPTION

Figure 1:
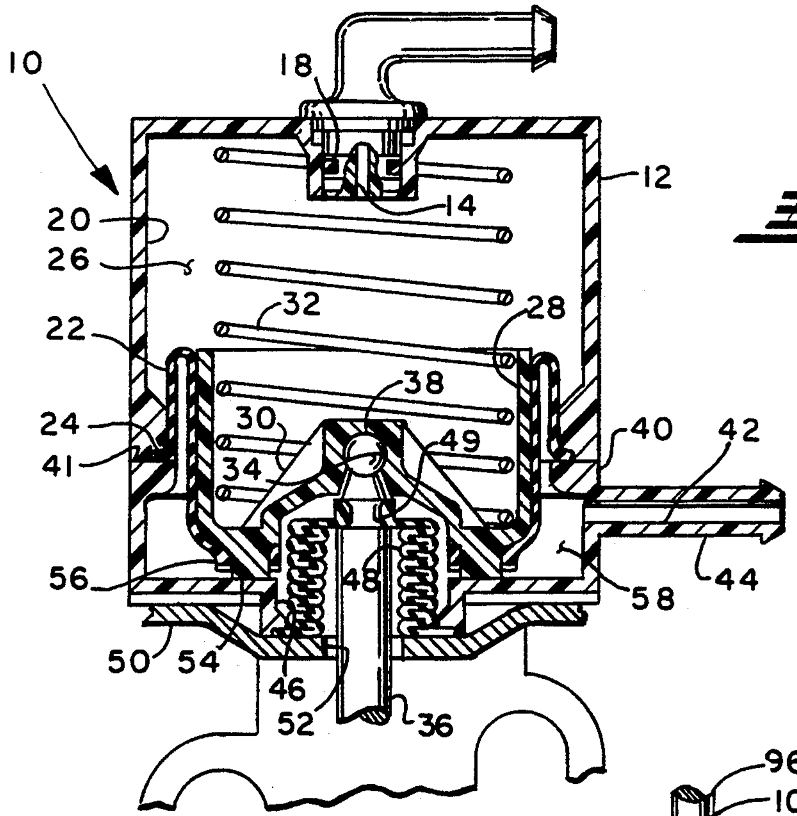

Referring to FIG. 1, a fluid pressure operated servoactuator assembly is illustrated generally at 10 as having an upper housing shell 12, a first fluid pressure port 14 formed in a fitting 16 provided in one end of the housing shell and which is sealed therein by a suitable seal ring 18. The housing shell 12 has a chamber 20 formed therein, which is closed at one end by a flexible diaphragm 22 having a bead portion 24 sealed about the periphery of the housing shell 12 to provide a ported pressure chamber 26 formed by the housing shell 12 and the diaphragm 22.

A rigid insert 28 having a generally cup-shaped configuration is received against the chamber side of the diaphragm, and is sealed thereabout. The insert 28 has one end of a return or bias spring 32 registered against the inside of the cup-shaped surface, with the opposite end of the spring 32 registered against the inside surface of the housing shell 12. Insert 28 has a central portion thereof denoted by reference numeral 30 extending inwardly of and nested in the lower end of coil spring 32; and, portion 30 has formed therein a generally spherical pivotal surface or socket denoted by reference numeral 34 and which is positioned intermediate the reaction ends of spring 32. A force output actuator rod 36 has one end thereof formed to a spherical configuration 34 as denoted by reference numeral 38, and is received in the spherical socket 34.

The housing has a lower shell 40 thereof attached to the shell 12 at parting line. 41 and sealing about the peripheral bead 24 of the diaphragm. Housing shell 40 has a second fluid port 42 formed therein and communicating with the interior of the housing shell 40 through a fitting 44. The housing shell 40 has actuator rod 36 extending outwardly and exteriorly thereof through an aperture 46 which has sealed thereabout one end of a bellows 48, which has the opposite end thereof sealed about: actuator rod 36 in a groove therein as denoted by reference numeral 49.

It will be understood that the housing shell 12 and the housing shell 40 may be secured together along a parting line 41 and sealed thereabout by any suitable expedient as, for example, weldment or fusion. The housing portion 40 is attached to a suitable mounting bracket 50, which has an aperture 52 formed therein through which actuator rod 36 extends.

The insert 28 also has portions thereof extending exteriorly of the diaphragm in the form of a plurality of circumferentially spaced lugs denoted by reference numeral 54, which have frictional fasteners 56 received thereover to retain the diaphragm and insert a secure assembly. The lugs 54 serve as limit-stops for the downward movement of the diaphragm insert under the urging of spring 32. The insert is shown in its unpressurized condition in FIG. 1 with the lugs 54 registered against the undersurface of the housing shell 40.

The housing shell 40, bellows 48, and the diaphragm 22 thus form a second fluid pressure chamber 58, which is pressurized via port 42 with a fluid pressure signal separate from the signal applied to port 14. Thus, the fluid pressure servomotor of FIG. 1 may be operated either by a vacuum signal through port 14, a positive pressure signal through port 42, or a combination of both.

It will be understood that the point of application of force of the rod acting against pivot surface 34 being centrally within the coil of spring 32 is such that the force of the rod provides a "righting" moment about the end of the spring registered against the underside of the cup-shaped surface for maintaining the insert 28 in the aligned arrangement illustrated in FIG. 1; and, therefore the arrangement of FIG. 1 prevents the inserted diaphragm from pivoting about the rod end and thus prevent buckling of the spring.

Figure 2:
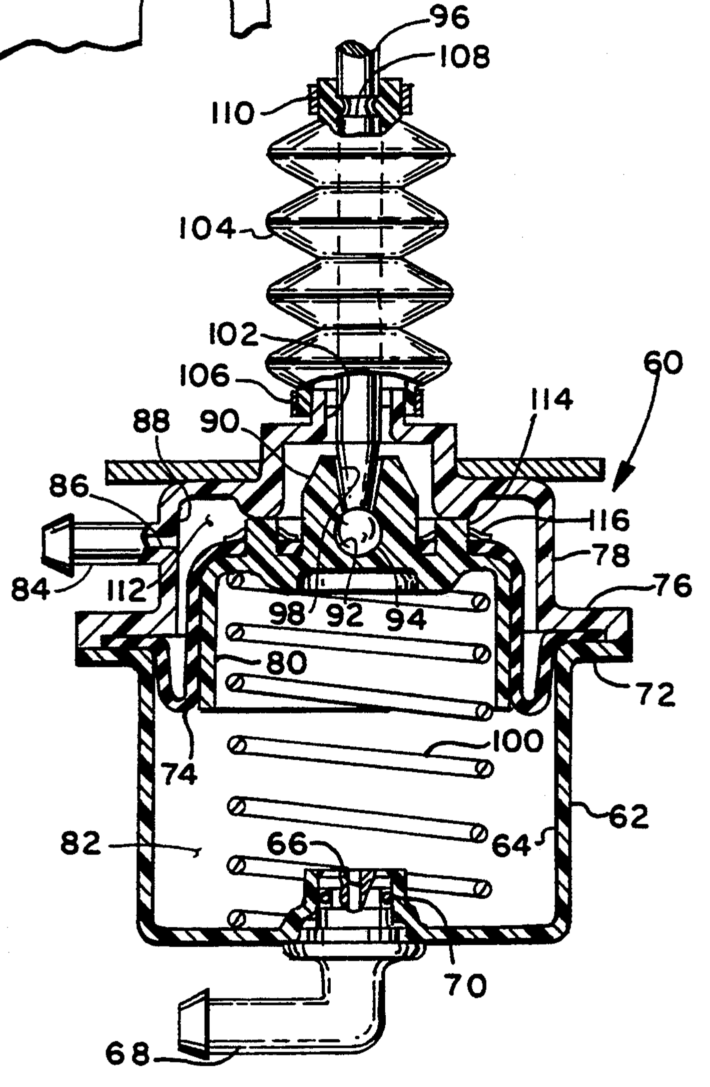
FIG. 2 is a cross-sectional view of an alternate embodiment of the servomotor of FIG. 1.

Referring to FIG. 2, another embodiment of the invention is indicated generally at 60, and has a lower housing shell 62 defining a cavity 64 therein, which is supplied by a fluid pressure port 66 formed in a fitting 68, which extends exteriorly of the housing, and which is sealed therein by a seal ring 70. Lower housing shell 62 has a flange 72 provided therearound, which seals the periphery of the flexible diaphragm 74 between the flange 72 and a corresponding flange 76 provided about an upper housing shell 78.

Diaphragm 74 has a rigid, generally cup-shaped insert 80 received in the cavity 64; and, insert 80 has the closed end thereof registered on the lower side of the diaphragm.

Upper housing shell 78 has a fitting 84 provided thereon with a second fluid pressure signal port 86 provided therethrough and communicating with the interior 88 of the housing shell 78.

The insert 80 has a central tower portion 90 thereof extending upwardly through the diaphragm 74; and, the portion 90 has a pivot surface in the form of a spherical socket 92 formed therein, and into which is received one preferably spherical end 94 of an actuator rod 96. The upper portion 90 of the insert has a conically tapered shroud 98 surrounding the lower end region of the rod defining in closely spaced relationship therewith a stop surface for limiting arcuate or pivotal motion of the insert about the rod to a small amount as illustrated in FIG. 2 by the narrow space between the rod and the conical surface 28.

The diaphragm insert 80 has a plurality of lugs 114 extending upwardly through the diaphragm, and secured thereover by suitable clamping means such as clips 116 which retain the insert against the diaphragm. The lugs 114 also serve as limit stops for the upward travel of the diaphragm insert; as, the stops register against the undersurface of the upper housing shell 78 at the limit of the diaphragm stroke.

A spring 100 is received in the chamber 82, and has the upper end thereof registered against the inner surface of the cup-shaped insert 80. The lower end of spring 100 is registered against the inner cavity 64 of the lower housing shell and the spring 100 is operative to bias the diaphragm in the upward direction.

The upper housing shell 78 has a reduced diameter collar portion 102 which surrounds the lower end region of the rod 96. Collar 102 has received thereover and sealed thereagainst the lower end of a flexible bellows 104, preferably formed of elastomeric material, with the end of the bellows 104 sealed over the collar by a suitable clamp band 106. Bellows 104 has the upper end thereof received over a groove 108 in rod 96; and, the upper end of the bellows is sealed over the groove by a clamp band 110. The bellows 104 thus seals the cavity 88 on the upper surface of diaphragm 74 to form a second fluid pressure signal chamber 112 on the upper side of the diaphragm, which signal chamber 112 is provided with a positive fluid pressure signal through port 86 in fitting 84.

It will be understood that the device 60 may be operated with a vacuum signal applied through port 66 or a positive pressure signal applied through port 86, or a combination of both.

In operation, undesired or excess rotation of the diaphragm insert about the pivot ball 94 on the end of the rod is prevented by the conically tapered surface 98; and, thus the diaphragm is prevented from buckling the spring 100.

Figure 3:
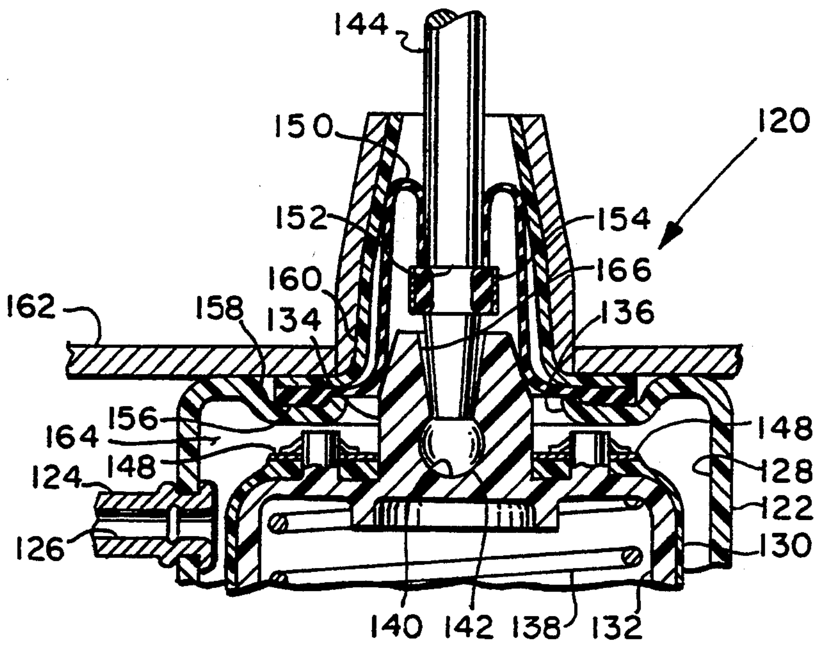
FIG. 3 is a cross-section of a portion of a fluid pressure actuated servomotor responsive to two fluid pressure signals; and, FIG. 4 is a portion of a cross-section of a single vacuum port actuated fluid servomotor employing the present invention.

Referring to FIG. 3, another embodiment of the invention is indicated generally at 120 and includes an upper housing shell 122 which has a fitting 124 with a fluid pressure port 126 therethrough communicating with the interior cavity 128 of the housing shell. A flexible diaphragm 130 is received in shell cavity 128 and is sealed thereabout in the manner described above with respect to the embodiments of FIGS. 1 and 2, it being understood that neither peripheral bead of the diaphragm nor the lower housing shell is shown.

Diaphragm 130 has a cup-shaped rigid insert 132 received centrally against the underside thereof with a central tower portion 134 extending upwardly through the diaphragm and sealed thereabout. Tower portion 134 extends through an aperture 136 formed in the housing.

The insert 132 has the upper end of a spring 138 registered thereagainst, which spring has its lower end registered against the interior of the lower housing shell (not shown) which has a fluid pressure port (not shown) formed therein in the manner described above with respect to FIGS. 1 and 2, the description of which will be here omitted for simplicity.

Tower 134 has a pivot surface preferably in the form of spherical socket 140 formed therein with a ball-shaped end 142 of an actuating rod 144 received therein.

Insert 132 has a plurality of lugs provided thereon which extend through the diaphragm 130 in circumferentially-spaced arrangement; and, the diaphragm is retained onto the insert by spring clips 148 received over the lugs.

A second diaphragm 150 is received over the rod 144, and has the inner periphery thereof sealed about a groove 152 formed in the rod; and, the inner peripheral bead on the diaphragm 150 is compressed therein by a clamp band 154. The outer periphery of the diaphragm 150 has a bead 156 provided thereon which is compressed in a groove 158 formed in the housing shell 122 by a flanged retainer 160, which is compressed thereon by connection of the housing shell 122 to a mounting bracket 162. The second diaphragm thus forms, with diaphragm 130, a second fluid pressure chamber 164, which is supplied by port 126 in fitting 124 attached to shell 122.

The tower portion 134 of insert 132 has a tapered conical surface 166 formed therein above the spherical pivot surface 140. The surface 166 surrounds the rod 144 and provides a movement stop to the lateral or arcuate movement of the insert 132 and diaphragm 130 about the rod. Spring 138 is thus pre-vented from buckling upon application of any sideloads to the insert by rod 144.

Figure 4:
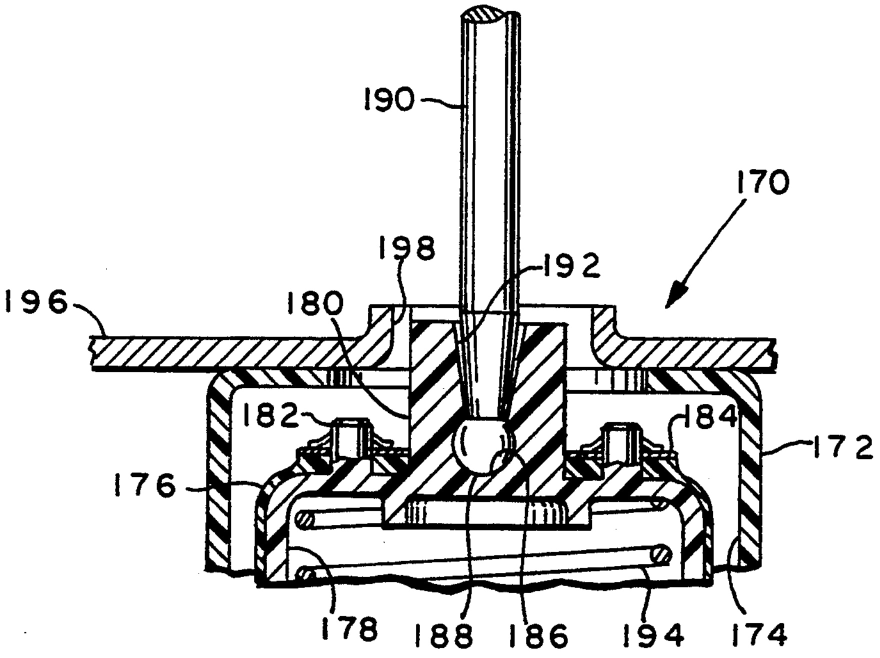

Referring to FIG. 4, another embodiment of a servomotor assembly is shown and indicated generally at 170, and has a housing shell 172 with a cavity 174 therein. It will be understood that a lower housing shell (not shown) is provided and has the outer periphery (not shown) of a flexible diaphragm 176 sealed thereabout to define a fluid pressure chamber (not shown) below the diaphragm which is supplied by a single fluid pressure signal port (not shown). It will be understood that the arrangement of the pressure chamber and fluid port in the embodiment 170 of FIG. 4 may be identical of that of the embodiment 60 of FIG. 2 with respect to port 66.

Diaphragm 176 has a generally cup-shaped insert 178 received therein, which insert has a central tower portion 180 extending through the diaphragm and sealed thereabout and retained thereon by means of a plurality of circumferentially spaced lugs 182 which extend through the diaphragm. Spring clips 184 are received over each of the lugs, and secure the inner periphery of the diaphragm in sealing engagement onto the insert 178. The tower portion 180 of the insert 178 has formed therein a generally spherically shaped pivot surface or socket 186 which is engaged by the generally spherical end 188 of an actuator member or rod 190 which extends exteriorly of the tower 180. Tower 180 has a generally conically tapered limit stop surface 192, which surrounds the lower end portion of rod 190 and limits the relative rotation of insert 178 with respect to the rod 190.

Insert 178 has the upper end of a coil spring 194 registered thereagainst, which spring has its lower end (not shown) registered against the interior of the lower housing shell (not shown) and biases the diaphragm and insert upwardly.

It will be understood that with respect to each of the embodiments in FIGS. 1 through 4, that means are provided to resist side loads encountered during installation of the servomotor for actuating a mechanism such as the crank arm attached to actuate a butterfly valve member. Typically in such applications, a preload is provided on the insert by compression of the spring within the housing and, such preload can be of sufficient magnitude where the actuating member or rod is slightly off center to create the side load which would cause undesirable rotation of the diaphragm and insert about the pivot end of the rod and buckling of the spring. Each of the embodiments described hereinabove employs means for preventing such undesired rotation of the diaphragm insert and diaphragm about the rod pivot. The embodiment of FIG. 1 provides for nesting of the rod pivot internally within the spring to provide stability for the reaction loads applied to the end of the spring; whereas, the embodiments of FIGS. 2, 3, and 4 employ a conically tapered surface on the insert to limit rotation of the insert with respect to the rod.

Although the invention has hereinabove been described with respect to the illustrated embodiments, it will be understood that the invention is capable of modification and variation, and is limited only by the scope of the following claims.

We claim:

1. A fluid pressure servomotor comprising:

(a) housing means defining an interior cavity and having a fluid pressure port communicating with said cavity;

(b) a flexible diaphragm disposed in said cavity and sealed thereabout to form on one side thereof a fluid pressure chamber communicating with said first fluid port;

(c) rigid insert means disposed through and sealed about the central region of said diaphragm, and movable therewith in response to changes in pressure in said chamber, said insert means defining a pivot surface on the chamber exterior side of said diaphragm and a cup-shaped portion on the interior side;

(d) an elongated actuator member having one end thereof pivotally engaging said pivot surface for movement in the direction of elongation of said insert means in response to movement of said diaphragm;

(e) spring means disposed in said chamber and having one reaction end thereof registered against said housing means and the opposite reaction end thereof registered against the closed end of said cup-shaped surface; and, (f) said means defining said pivot surface includes means operable to limit rotation of said insert means with respect to said actuator member.

2. The servomotor defined in claim 1, wherein said means limiting rotation of said insert means includes said portion of said insert defining said pivot surface extending to a position intermediate said reaction ends of said spring means.

3. The servomotor defined in claim 1, wherein said means limiting rotation includes a shroud formed on said rigid insert means, said shroud surrounding said actuator member and limiting pivotal movement of said member with respect to said insert means.

4. The servomotor defined in claim 1, wherein said housing means includes a bellows having one end thereof sealed about said actuator member and forming a second fluid pressure chamber on the side of said diaphragm opposite said one side; and said housing means includes a second fluid port therein communicating with said second fluid pressure chamber.

5. The servomotor defined in claim 1, wherein said spring means comprises a coil spring and said means operable to prevent rotation comprises said means defining a pivot surface being nested in one end of said coil spring.

6. A fluid pressure servomotor comprising:

(a) housing means defining a fluid pressure chamber having a fluid port therein adapted for connection to a fluid pressure signal;

(b) flexible diaphragm means forming a portion of the boundary of said fluid pressure chamber and movable in response to changes in fluid pressure in said chamber;

(c) rigid insert means attached to said diaphragm means for movement therewith for providing a spring reaction surface on one side of said diaphragm, said insert means having certain portions thereof passing through said diaphragm means and extending from the opposite side thereof and defining a pivot surface thereon;

(d) actuator rod means pivotally connected to said insert means on said pivot surface and extending exteriorly of said housing means;

(e) said certain portions of said insert means including means operable to limit said pivotal movement of said insert means with respect to said actuator rod means; and, (f) spring means registered against said reaction surface and operable to bias said insert and diaphragm means in one direction.

7. The servomotor defined in claim 6, wherein said means operable to limit said pivotal movement comprises means defining a shroud surrounding said actuator rod means.

8. The servomotor defined in claim 6, wherein said means operable to limit said pivotal movement comprises a shroud around said rod means formed on said certain portions of said insert means.

9. The servomotor defined in claim 6, wherein said insert means has a cup-shaped configuration with said reaction surface formed in the closed end of said cup-shape.

10. The servomotor defined in claim 6, wherein said housing means includes means operable to limit pivotal movement of said actuator means with respect thereto.

* * * * *